(12) United States Patent
Hauber (10) Patent No.: US 12,055,369 B2
(45) Date of Patent: Aug. 6, 2024

(54) LIGHTWEIGHT COMPOSITE ARMOR

(71) Applicant: Trelleborg Sealing Solutions Albany, Inc., Niskayuna, NY (US)

(72) Inventor: David Edgar Hauber, Troy, NY (US)

(73) Assignee: Trelleborg Sealing Solutions Albany, Inc., Niskayuna, NY (US)

( * ) Notice: Subject to any disclaimer, the term of this patent is extended or adjusted under 35 U.S.C. 154(b) by 332 days.

(21) Appl. No.: 17/454,241

(22) Filed: Nov. 9, 2021

(65) Prior Publication Data

US 2023/0146363 A1  May 11, 2023

(51) Int. Cl.
*F41H 5/04* (2006.01)
*B29C 53/58* (2006.01)
*B29K 101/12* (2006.01)
*B29K 223/00* (2006.01)
*B29L 31/00* (2006.01)

(52) U.S. Cl.
CPC ......... *F41H 5/0435* (2013.01); *B29C 53/582* (2013.01); *B29K 2101/12* (2013.01); *B29K 2223/0683* (2013.01); *B29L 2031/768* (2013.01)

(58) Field of Classification Search
None
See application file for complete search history.

(56) References Cited

U.S. PATENT DOCUMENTS

| | | |
|---|---|---|
| 4,760,611 A | 8/1988 | Huet |
| 5,340,633 A | 8/1994 | van der Loo et al. |
| 9,194,663 B2 | 11/2015 | Schaupert et al. |
| 9,696,122 B2 | 7/2017 | Bergman |
| 2016/0136929 A1 | 5/2016 | Meiss et al. |

FOREIGN PATENT DOCUMENTS

| | | |
|---|---|---|
| CN | 109141123 A | 1/2019 |
| CN | 112814315 A | 5/2021 |
| CN | 112815777 A | 5/2021 |
| FR | 2635177 A1 | 2/1990 |
| JP | 2007063710 A | 3/2007 |
| JP | 2019072859 A | 5/2019 |
| WO | 2008/152337 A1 | 12/2008 |

OTHER PUBLICATIONS

Zhang, Rui, et al., Influence of prestress on ballistic performance of bi-layer ceramic composite armors: Experiments and simulations, Composite Structures 227 (2019) 111258.

*Primary Examiner* — Alexander S Thomas
(74) *Attorney, Agent, or Firm* — Orbit IP (57) ABSTRACT

A composite armor includes a ceramic substrate defining a frontside opposite a backside, where a thickness is defined extending between the frontside and the backside. A first tension-wrapped thermoplastic composite overwind is wrapped around the ceramic substrate about the frontside and backside. A first portion of the first overwind overlaps a second portion of the first overwind. The first and second portions of the first overwind are fixedly attached to one another utilizing a first localized heating. The first overwind includes a first tensile pretension. A backing is disposed about the backside of the ceramic substrate attached to the first overwind. The ceramic substrate has a higher modulus of elasticity in comparison to the overwind. The first overwind has a higher modulus of elasticity in comparison to the backing.

22 Claims, 5 Drawing Sheets

LIGHTWEIGHT COMPOSITE ARMOR

CROSS-REFERENCE TO RELATED APPLICATIONS

None.

DESCRIPTION

Field of the Invention

The present invention generally relates to armor. More particularly, the present invention relates to a lightweight pre-compressed ceramic-based anti-ballistic composite armor that may be used in applications such as military helicopters for protecting various vital structural assemblies.

Background of the Invention

Huet (U.S. Pat. No. 4,760,611) discloses a ceramic core surrounded by a metal casting. During cooling, a prestress is induced. However, the metal casting adds significant weight to the overall assembly.

Zhang discloses a prestressed ceramic disk using a metal compression ring that is preheated and then cooled around the ceramic disk. Unfortunately, the metal compression ring adds a significant amount of weight. Furthermore, a projectile such as an armor piercing bullet hitting along the metal ring provides too little protection. Finally, packaging such a circular structure is less than ideal.

Bergman discloses bonding a high expansion material directly to the ceramic armor to induce prestress when it contracts upon cooling. In practice, the approach Bergman takes cannot induce high compressive strength by bonding the high expansion material directly to the surface of the ceramic.

In general, the prior art appreciates the value of prestressing the ceramic faceplate in a composite armor but achieves very poor performance in terms of degree of compression and/or added weight to achieve the prestress. Accordingly, there is a need for a better solution. The present invention fulfills these needs and provides other related advantages.

SUMMARY OF THE INVENTION

An exemplary embodiment of the present invention is a composite armor (10) including a ceramic substrate (12) (i.e. plate) defining a frontside (12) opposite a backside (14), wherein a thickness (Z) is defined extending between the frontside and the backside. A first tension-wrapped thermoplastic composite overwind (20) is wrapped around the ceramic substrate about the frontside and backside. A first portion (21) of the first overwind overlaps a second portion (22) of the first overwind, wherein the first and second portions of the first overwind are fixedly attached to one another utilizing a first localized heating (40). The first overwind includes a first tensile pretension (23). A backing (30) is disposed about the backside of the ceramic substrate attached to the first overwind. The ceramic substrate has a higher modulus of elasticity in comparison to the overwind. Also, the first overwind has a higher modulus of elasticity in comparison to the backing.

In other exemplary embodiments, wherein the ceramic substrate may have a modulus of elasticity above 400 GPa. The ceramic substrate may be boron carbide, silicon carbide, aluminum oxide, titanium diboride or any other suitable material.

In other exemplary embodiments, the ceramic substrate may be monolithic constituting a single part or the ceramic substrate may be an assembly comprising a plurality of smaller ceramic pieces (12a-i) assembled together.

In other exemplary embodiments, the backing may have a modulus of elasticity below 150 GPa. The backing may be Dyneema® fiber, aramid(e.g., Kevlar®) fiber or other suitable composite material.

In other exemplary embodiments, the first overwind may comprise a continuous fiber reinforced thermoplastic polymer. The continuous fiber may comprise carbon fiber, glass fiber, basalt fiber or aramid fiber and the thermoplastic polymer may comprise PE, PP, PA, PPS or PEEK or other suitable polymer.

In other exemplary embodiments, the first tensile pretension may be at least 50 or 100 lbs of tensile force per inch width of the composite overwind tape. Alternatively, the first tensile pretension may be greater than 50 or 100 lbs of force per inch width of the composite overwind tape but less than the ultimate tensile strength of the first and second overwinds, or wherein the first tensile pretension may be greater than 50 or 100 lbs of force but less than the yield strength of the first and second overwinds.

In other exemplary embodiments, the ceramic substrate may be rectangular in shape having a width (X-dimension), a height (Y-dimension) and the thickness (Z-dimension), the ceramic substrate defining the frontside opposite the backside contiguous to a top end (15), a bottom end (16), a left end (17) and a right end (18), wherein the first overwind is wrapped around the ceramic substrate about the frontside, left end, backside and right end extending along the width.

In other exemplary embodiments, a second tension-wrapped thermoplastic composite overwind (25) may be wrapped around the ceramic substrate about the frontside, top end, backside and bottom end extending along the height. A first portion (26) of the second overwind overlaps a second portion (27) of the second overwind. The first and second portions of the second overwind are fixedly attached to one another utilizing a second localized heating (41), wherein the second overwind includes a second tensile pretension (28).

In other exemplary embodiments, an edge (37) may be defined between one of the top, bottom, left or right ends and either of the frontside or backside, wherein the edge comprises a radius, the edge radius (ER) being at least 0.1 inches in radius. Likewise, a corner (38) may be defined between either the top and left end, the top and right end, the bottom and left end or the bottom and right end, wherein the corner comprises a radius, the corner radius (CR) being is at least 0.1 inches in radius.

In other exemplary embodiments, the first overwind may comprise a plurality of first overwinds disposed adjacent to one another, and wherein the second overwind may comprise a plurality of second overwinds disposed adjacent to one another. The second overwind may be oriented perpendicular to and disposed at least partially over the first overwind. Alternatively, the first and second overwinds may be made from a common continuous overwind. Alternatively, the first overwind may comprise a plurality of first overwinds helically wrapped about the substrate made from a common continuous overwind.

Another exemplary embodiment of the present invention is a pre-compressed ceramic-based anti-ballistic composite armor, comprising a ceramic substrate rectangular in shape having a width (X-dimension), a height (Y-dimension) and a thickness (Z-dimension), the substrate defining a frontside opposite a backside contiguous to a top end, a bottom end, a left end and a right end. A first tension-wrapped thermoplastic composite overwind is wrapped around the substrate about the frontside, left end, backside and right end extending along the width. A second tension-wrapped thermoplastic composite overwind is wrapped around the substrate about the frontside, top end, backside and bottom end extending along the height. A first portion of the first and/or second overwind overlaps a second portion of the first and/or second overwind, wherein the first and second portions are fixedly attached to one another utilizing a localized heating. The first and second overwinds include a tensile pretension of at least 50 lbs (or 100 lbs) of tensile force per inch width of the composite overwind tape. A backing is disposed about the backside of the ceramic substrate attached to the first and/or second overwind. The ceramic substrate has a higher modulus of elasticity in comparison to the first and second overwinds. The first and the second overwinds have a higher modulus of elasticity in comparison to the backing. The ceramic substrate has a modulus of elasticity above 400 GPa. The backing has a modulus of elasticity below 150 GPa.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 14:
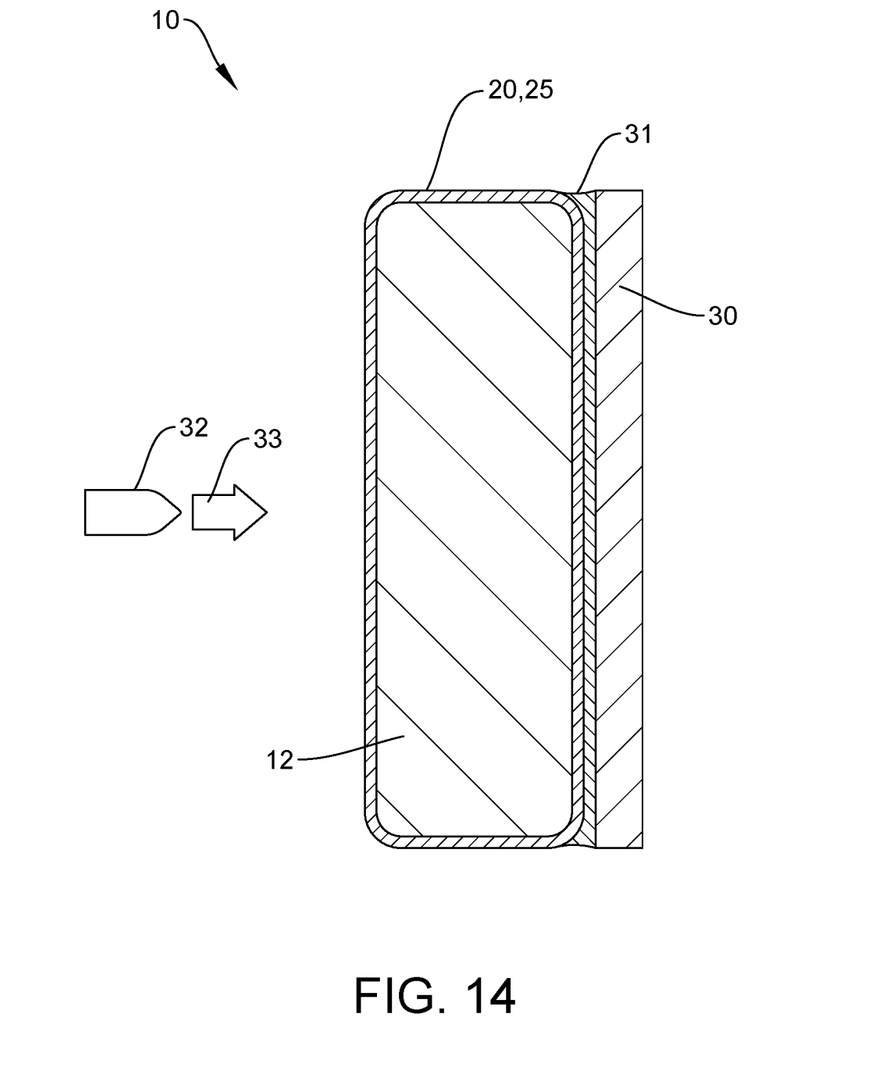
FIG. 14 is a sectional view of the present invention.

One embodiment of a pre-compressed ceramic-based anti-ballistic composite armor 10 is shown in cross section in FIG. 14. However, to better understand the construction of the armor 10, it is best to start with FIGS. 1-3 which show a substrate (i.e., plate, structure) 12. The substrate 12 (i.e. substrate, layer) may be rectangular in shape having a width (X-dimension), a height (Y-dimension) and a thickness (Z-dimension). The size and shape of the substrate may vary, but is generally around 2-24 inches in width, 2-24 inches in height and 0.25-1 inches in thickness depending on the application and specific ballistic protection level. Being rectangular in form, the substrate defines a frontside 13 opposite a backside 14. Contiguous to the frontside and backside are four ends, which are a top end 15, a bottom end 16, a left end 17 and a right end 18. Note that the rectangular shape is used here as a simple representation of the present invention. It will be understood by those skilled in the art that various other shapes can benefit from similar tension overwraps, such as triangular, square, pentagon, hexagon, octagon and other polygons. Furthermore, even curved shapes (non-polygon) may be used such as circular, oval and the like.

The substrate may be made from a variety of materials. In this embodiment, the substrate may be a ceramic substrate. In particular, the substrate may be made from boron carbide which has a modulus of elasticity of 460 GPa. Other materials are possible for the substrate, such as silicon carbide, aluminum oxide, titanium diboride, or other suitable materials.

Figure 1:
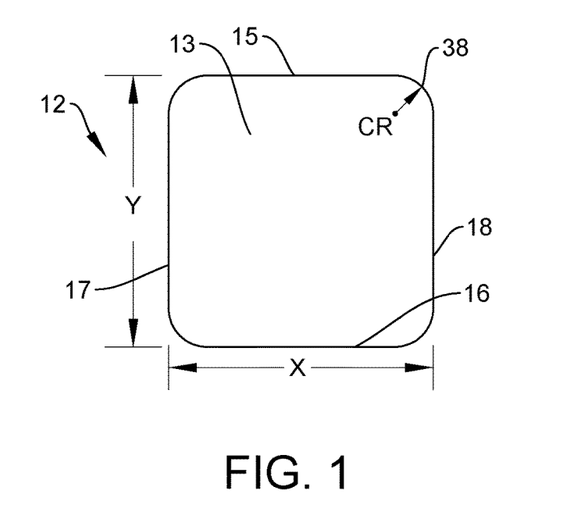
FIG. 1 is a front view of an exemplary ceramic substrate embodied in the present invention.
Figure 2:
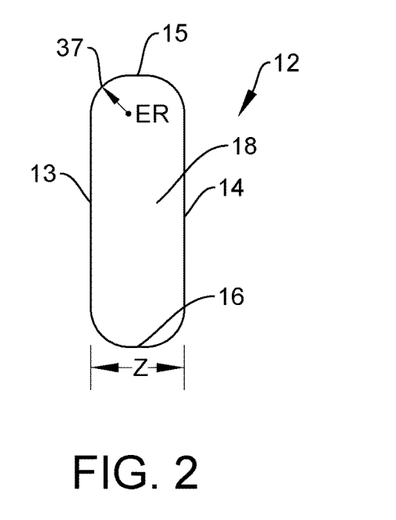
FIG. 2 is an end view of the structure of FIG. 1.
Figure 3:
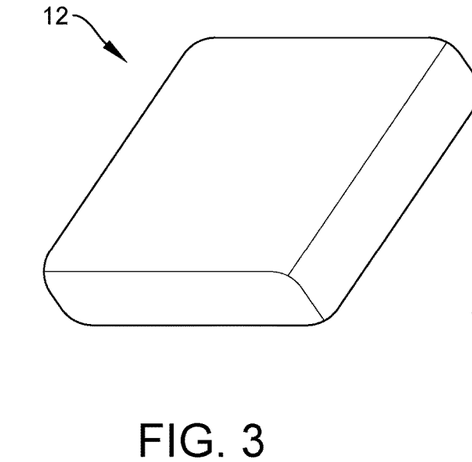
FIG. 3 is a three-dimensional view of the structure of FIGS. 1 and 2.
Figure 4:
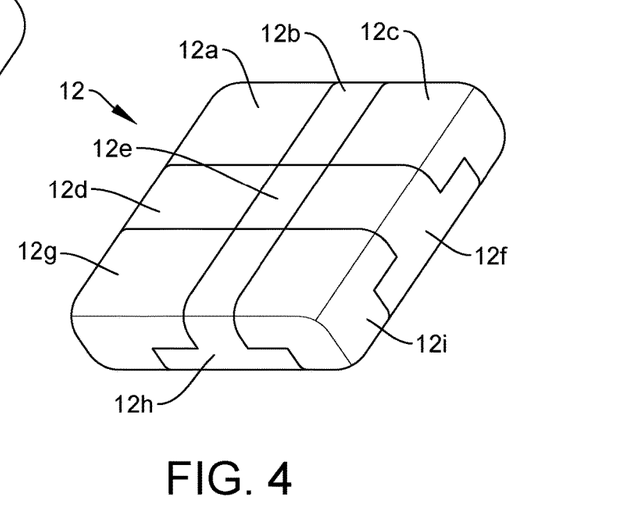
FIG. 4 is a view similar to FIG. 3 but now showing another embodiment of the ceramic substrate being an assembly comprising an example of individual parts assembled together.

The substrate in FIGS. 1-3 is monolithic in that it constitutes a single part. However, as shown in FIG. 4 the substrate 12 may be made as an assembly comprising a plurality of smaller ceramic pieces 12a-12i assembled together to form the overall substrate 12. Furthermore, as shown in FIG. 4 the shape of each piece of substrate may have a unique shape such that all the pieces fit together in a jigsaw like format. This can be done to help the pieces stay aligned to one another or to prevent a projectile from penetrating between any gaps, such that gaps that extend through the thickness are eliminated. FIG. 4 is illustrative of just one of the many possible shapes for a plurality of smaller ceramic pieces, as the specific shape and assembly is not an object of the present invention.

Figure 5:
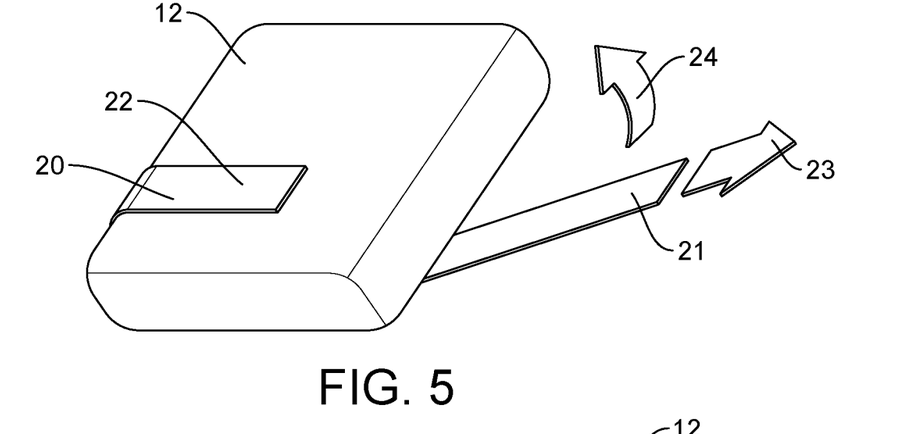
FIG. 5 is a view of FIG. 3 now showing a first overwind.

FIG. 5 is very similar to FIG. 3 but now shows a first tension-wrapped thermoplastic composite overwind 20 wrapped around the substrate about the frontside, left end, backside and right end extending along the width. The arrow 23 depicts that a tension is being introduced and arrow 24 depicts how the overwind is being wrapped about the substrate.

Figure 6:
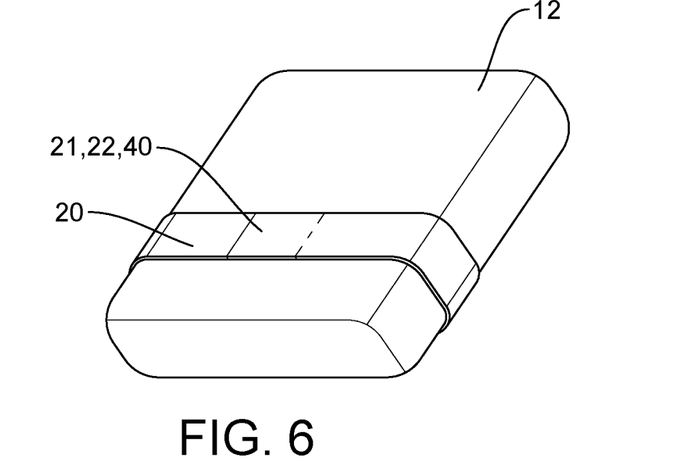
FIG. 6 is a view of FIG. 5 now showing the first overwind being attached to itself under a pretension.

FIG. 6 shows the next step from FIG. 5 where a first portion 21 of the first overwind overlaps a second portion 22 of the first overwind. The first and second portions of the first overwind are fixedly attached to one another utilizing a first localized heating 40 that locks in the first tensile pretension 23. The localized heating may be accomplished in many ways, such as using a hot air, a radiant energy, a laser beam, an ultrasonic means and/or any other suitable means. The localized heating causes the tape to bond to itself and does not appreciably heat the ceramic substrate due to the transient application of localized heating.

Alternatively, in another embodiment not shown, the thermoplastic composite tape may be wrapped helically in multiple wraps such that the overwind tape bonds to itself during the wrapping process.

Figure 7:
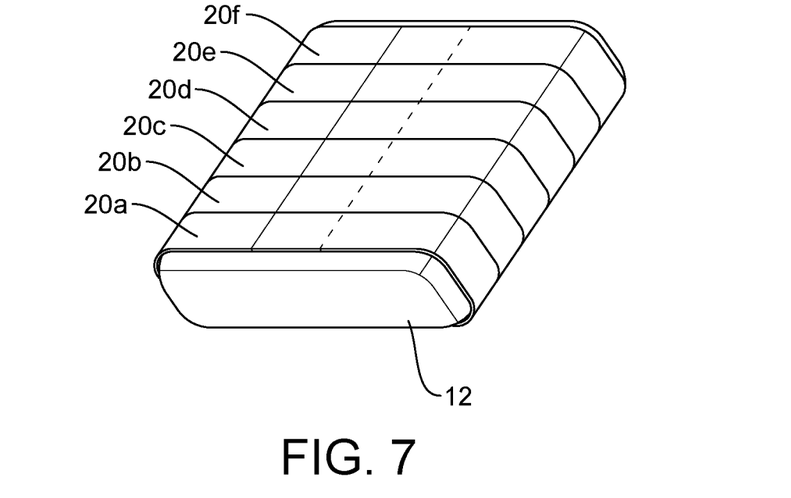
FIG. 7 is a view of FIG. 6 now showing a plurality of first overwinds adjacently disposed.

FIG. 7 now shows how a plurality of first tension-wrapped thermoplastic composite overwinds may be disposed adjacent to one another in a similar manner. In this way, the entirety of the substrate is now placed under a compression along the width dimension. As shown herein, there are six first overwinds 20a-20f. However, it is understood that any number over first overwinds (disposed adjacently or helically wrapped) may be used ranging from 1 to any number as is necessary based upon the width of the overlay and the size of the substrate.

Figures 8, 9:
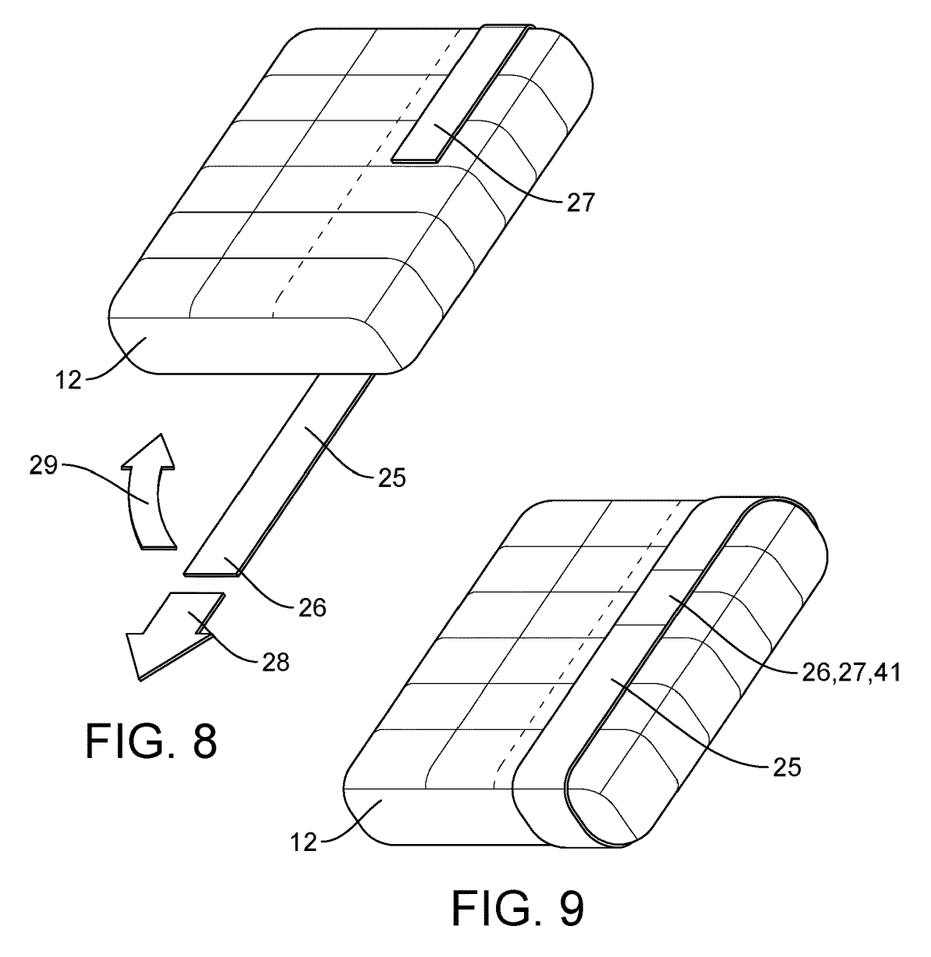
FIG. 8 is a view of FIG. 7 now showing a second overwind.
FIG. 9 is a view of FIG. 8 now showing the second overwind being attached to itself under a pretension.

FIG. 8 is the next step from FIG. 7 where a similar second overwind 25 is utilized to compress the substrate about the height dimension. In particular, a second tension-wrapped thermoplastic composite overwind 25 is wrapped around the substrate about the frontside, top end, backside and bottom end extending along the height.

FIG. 9 is next step from FIG. 8 and shows how a first portion 26 of the second overwind overlaps a second portion 27 of the second overwind. Then, in a similar manner, the first and second portions of the second overwind are fixedly attached to one another utilizing a second localized heating 40. The arrow 28 depicts that a tension is being introduced and arrow 29 depicts how the overwind is being wrapped about the substrate.

Figure 10:
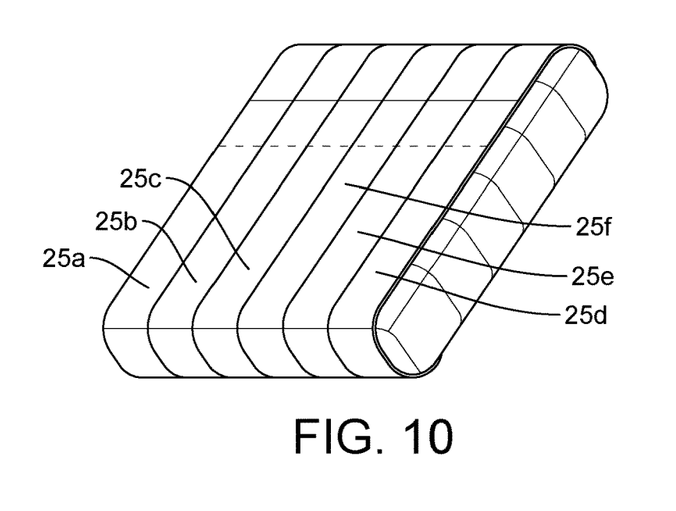
FIG. 10 is a view of FIG. 9 now showing a plurality of first overwinds adjacently disposed.

FIG. 10 now shows how a plurality of second tension-wrapped thermoplastic composite overwinds may be disposed adjacent to one another in a similar manner. In this way, the entirety of the substrate is now placed under a compression along the height dimension. As shown herein, there are six first overwinds 25a-25f. However, it is understood that any number over first overwinds may be used ranging from 1 to any number as is necessary based upon the width of the overlay and the size of the substrate.

Figure 11:
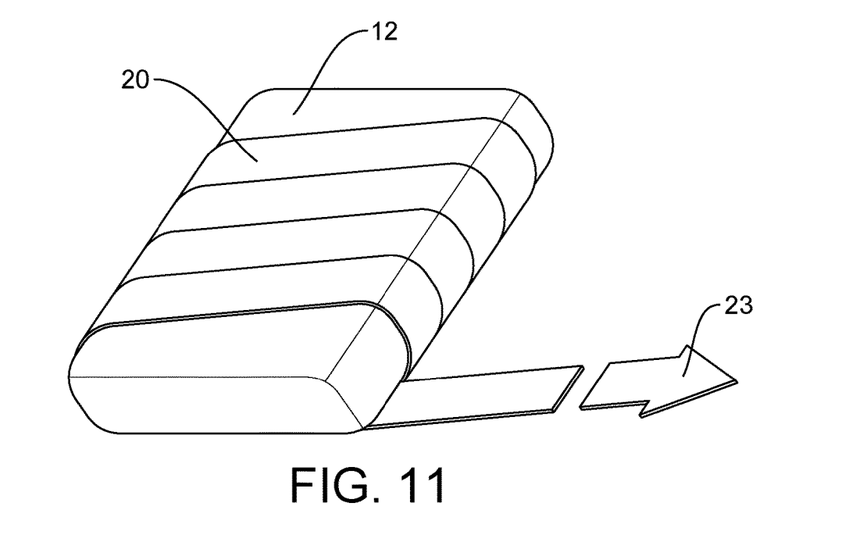
FIG. 11 is another embodiment of a helically wrapped overwind of the present invention.
Figures 12, 13:
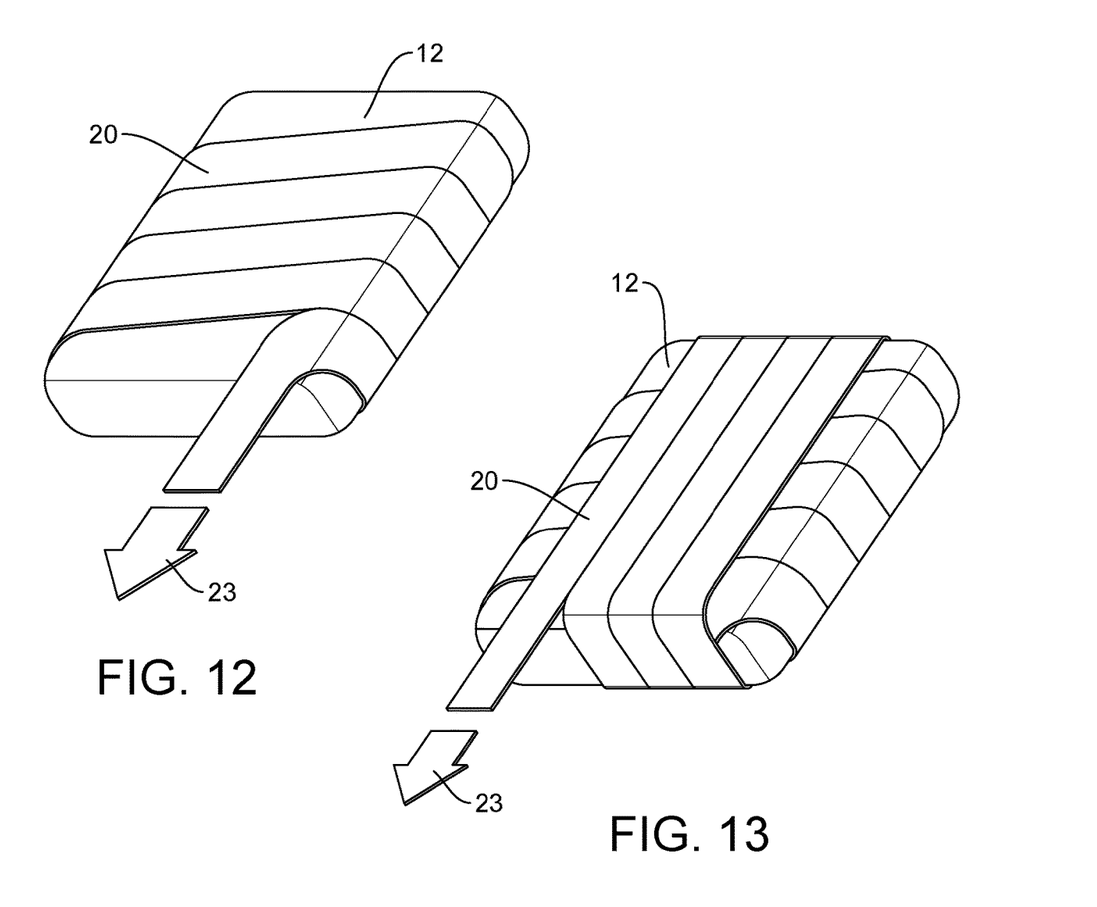
FIG. 12 is a view of FIG. 11 now showing the overwind during a transition between perpendicular directions.
FIG. 13 is a view of FIG. 12 now showing the helically wrapped overwind in the perpendicular direction.

Alternatively, the thermoplastic composite tape may be wrapped helically in multiple wraps such that the tape bonds to itself. Furthermore, a single helical wrap may be wrapped in a helical fashion in the X-dimension and then transitioned to being wrapped in a helical fashion in the Y-dimension, such that one wrapping process can be utilized from start to finish as best shown in FIGS. 11-13. FIG. 11 shows another embodiment of a tension-wrapped thermoplastic composite overwind 20 being wrapped in a helical manner. Then, in FIG. 12, the overwind 20 takes a turn and starts wrapping about the perpendicular direction. FIG. 13 shows how one overwind 20 can be used to wrap the entirety of the substrate 12.

When wrapping the substrate 12, it is desirable that the edges between the sides and ends of the substrate are not perfectly shaped at a perpendicular angle. Likewise, the corners at the ends of the substrate may also not be perfectly shaped at a perpendicular angle. This is because the overwinds need to wrap around these structures and any such sharp perpendicular shape could create a stress point which prematurely rips the overwind during wrapping or during use when stopping a projectile. Thus, a rounded feature is desired. In particular, when looking at FIG. 2, an edge is defined between one of the top, bottom, left or right ends and either of the frontside or backside, wherein the edge comprises a radius, the edge radius ER being at least 0.1 inches in radius. Similarly, when looking at FIG. 1, a corner is defined between either the top and left end, the top and right end, the bottom and left end or the bottom and right end, wherein the corner comprises a radius, the corner radius CR being is at least 0.1 inches in radius.

In some embodiments, the first and/or second overwinds may comprise a continuous fiber reinforced thermoplastic polymer. In particular, the continuous fiber may comprise carbon fiber, glass fiber, basalt fiber, aramid fiber, or any other suitable fiber and the thermoplastic polymer may comprise PE, PP, PA, PPS, PEEK or any other suitable thermoplastic polymer.

As can be understood from FIGS. 5-10, the second plurality of overwinds are oriented perpendicular in this particular rectangular embodiment to and disposed at least partially over the first plurality of overwinds. Each overwind includes a tensile pretension that is at least 50 lbs per inch of tape width of tensile force. In other exemplary embodiments, the tensile force may be at least 50, 100, 250, 500 or 1000 lbs of force per inch of tape width.

It is important that the substrate be compressed to a certain extent, but not compressed too much by the overwinds. This is because when a projectile hits the substrate and the substrate shatters and expands, it is desirable that the overwinds continue to absorb energy such that the pretension should not be too close to the ultimate strength or yield strength. Therefore, the first and second tensile pretensions are greater than 50 or 100 lbs per inch of tape width of force but less than the ultimate tensile strength of the first and/or second overwinds. Said differently, the first and second tensile pretensions are greater than 50 or 100 lbs of force but preferably less than 1000 lbs in the case of 1 inch wide, 0.005 inch thick IM7 carbon fiber reinforced thermoplastic composite tape.

The first and second overwinds comprise a modulus of elasticity which is less than the substrate. For example, if the overwind is made from IM7 (carbon fiber) and PEEK, the modulus of elasticity is 170 GPa. This is below a modulus of elasticity of boron carbide at 460 GPa.

Now, turning back to FIG. 14, the pre-compressed ceramic-based anti-ballistic composite armor 10 is shown in cross section. A backing 30 is now attached to the backside of the substrate upon the first and second plurality of overwinds 20, 25. The backing 30 may use an adhesive 31, bond, glue or other means to attach to the overwinds. Importantly, the substrate has a higher modulus of elasticity in comparison to the first and second overwinds, and the first and second overwinds have a higher modulus of elasticity in comparison to the backing. The backing is the most elastic part of the assembly, such that it absorbs the energy of a projectile 32 traveling along direction 33 after it hits the armor 10. Ideally, the projectile shatters into smaller pieces after hitting the ceramic substrate while the overwinds increase the ballistic performance of the substrate by constraining the shattered pieces. Energy can then be distributed over a larger area of the backing such that the projectile does not penetrate through.

The backing should have a lower modulus of elasticity than the ceramic or composite overwrap such as below 150 GPa. In particular, the backing may be made from Dyneema® (ultra-high-molecular-weight polyethylene fiber) which has a modulus of elasticity of approximately 116 GPa. Alternatively, the backing may be made from aramid fiber such as Kevlar® which has a modulus of elasticity of approximately 35 GPa or any other suitable material. The difference in modulus of elasticity is advantageously employed in the composite overwrap to provide an impedance mismatch resulting in reflected shock waves from the ballistic impact further improving ballistic performance of the armor system.

While the two-dimensional compressive stress as in the rectangular example is the preferred embodiment, the above rectangular example is just one example of a multitude of shapes that can be employed in the present invention. The only requirement is that the composite must apply compressive stress to the ceramic after the composite overwrap is completed. The compressive stress may be in one, two or three dimensions and may be made with one, two or any number of overwinds. For example, a tubular or partial tubular substrate 12 (i.e. a C-shaped extrusion) can still be wrapped with the overwind 20 in just one dimension which then can still induce a compression within the substrate 12.

As can be understood by those skilled in the art, the extent of teaching of this disclosure may be very broad as a ceramic substrate is not limited to being fully flat but may be curved or tubular in shape.

Referring back to the prior art of Bergman, Bergman directly bonds the thermal expansion materials 101 and 102 with adhesive layers 107 and 106 to the ceramic substrate 104 at bonding temperatures of between 50° C. and 250° C. Allegedly, when the structure is subsequently cooled, the bonding thermal expansion material should contract to a greater degree than the ceramic substrate. To the contrary of Bergman, the inventor of the present invention doesn't need to heat the overall structure and also doesn't need to bond directly to the ceramic substrate. Rather, the inventors of the present invention use composite overwinds that attach to themselves already having the pretension. This means the actual pretension can be closer controlled to a specific value. Furthermore, this means the inventors don't need to use an adhesive to bond directly to the ceramic substrate.

Although several embodiments have been described in detail for purposes of illustration, various modifications may be made to each without departing from the scope and spirit of the invention. Accordingly, the invention is not to be limited, except as by the appended claims.

NUMERALS 10 pre-compressed ceramic-based anti-ballistic composite armor
12 plate, substrate, layer
13 frontside
14 backside
15 top end
16 bottom end
17 left end
18 right end
20 first overwind
21 first portion, first overwind
22 second portion, first overwind
23 first tensile pretension, first overwind
24 wrap direction, first overwind
25 second overwind
26 first portion, second overwind
27 second portion, second overwind
28 second tensile pretension, second overwind
29 wrap direction, second overwind
30 backing
31 adhesive, bond, glue
32 projectile
33 direction, projectile
37 edge
38 corner
40 first localized heating
41 second localized heating
X width, substrate
Y height, substrate
Z thickness, substrate
ER edge radius
CR corner radius

What is claimed is:

1. A composite armor, comprising:
  a ceramic substrate defining a frontside opposite a backside, wherein a thickness is defined extending between the frontside and the backside;
  a first tension-wrapped thermoplastic composite overwind wrapped around the ceramic substrate about the frontside and the backside, wherein a first portion of the first overwind overlaps a second portion of the first overwind, wherein the first and second portions of the first overwind are fixedly attached to one another utilizing a first localized heating, wherein the first overwind includes a first tensile pretension; and
  a backing disposed about the backside of the ceramic substrate attached to the first overwind;
  wherein the ceramic substrate has a higher modulus of elasticity in comparison to the first overwind; and
  wherein the first overwind has a higher modulus of elasticity in comparison to the backing.

2. The composite armor of claim 1, wherein the ceramic substrate has a modulus of elasticity above 400 GPa.

3. The composite armor of claim 2, wherein the ceramic substrate comprises boron carbide, silicon carbide, aluminum oxide or titanium diboride.

4. The composite armor of claim 2, wherein the ceramic substrate is monolithic constituting a single part or wherein the ceramic substrate is an assembly comprising a plurality of smaller ceramic pieces assembled together.

5. The composite armor of claim 2, wherein the backing has a modulus of elasticity below 150 GPa.

6. The composite armor of claim 5, wherein the backing comprises an ultra-molecular-weight polyethylene fiber or an aramid fiber composite material.

7. The composite armor of claim 1, wherein the first overwind comprises a continuous fiber reinforced thermoplastic polymer, wherein the continuous fiber comprises carbon fiber, glass fiber, basalt fiber or aramid fiber and the thermoplastic polymer comprises PE, PP, PA, PPS or PEEK.

8. The composite armor of claim 1, wherein the first tensile pretension is at least 50 lbs of tensile force per inch of tape width.

9. The composite armor of claim 1, wherein the ceramic substrate is rectangular in shape having a width, a height and the thickness, the ceramic substrate defining the frontside opposite the backside contiguous to a top end, a bottom end, a left end and a right end, wherein the first overwind is wrapped around the ceramic substrate about the frontside, left end, backside and right end extending along the width.

10. The composite armor of claim 9, including a second tension-wrapped thermoplastic composite overwind wrapped around the ceramic substrate about the frontside, top end, backside and bottom end extending along the height.

11. The composite armor of claim 10, wherein a first portion of the second overwind overlaps a second portion of the second overwind, wherein the first and second portions of the second overwind are fixedly attached to one another utilizing a second localized heating, wherein the second overwind includes a second tensile pretension.

12. The composite armor of claim 11, wherein the first and second tensile pretensions are greater than 100 lbs of force per inch of tape width but less than the ultimate tensile strength of the first and second overwinds, or wherein the first and second tensile pretensions are greater than 100 lbs of force per inch of tape width but less than the yield strength of the first and second overwinds.

13. The composite armor of claim 10, wherein the first overwind comprises a plurality of first overwinds disposed adjacent to one another, and wherein the second overwind comprises a plurality of second overwinds disposed adjacent to one another.

14. The composite armor of claim 13, wherein the second overwind is oriented perpendicular to and disposed at least partially over the first overwind.

15. The composite armor of claim 10, wherein the first and the second overwinds are made from a common continuous overwind.

16. The composite armor of claim 9, wherein an edge is defined between one of the top, bottom, left or right ends and either of the frontside or backside, wherein the edge comprises a radius, the edge radius being at least 0.1 inches in radius, and wherein a corner is defined between either the top and left end, the top and right end, the bottom and left end or the bottom and right end, wherein the corner comprises a radius, the corner radius being is at least 0.1 inches in radius.

17. The composite armor of claim 1, wherein the first overwind comprises a plurality of first overwinds helically wrapped about the substrate made from a common continuous overwind.

18. A pre-compressed ceramic-based anti-ballistic composite armor, comprising:
- a ceramic substrate rectangular in shape having a width, a height and a thickness, the substrate defining a frontside opposite a backside contiguous to a top end, a bottom end, a left end and a right end;
- a first tension-wrapped thermoplastic composite overwind wrapped around the substrate about the frontside, left end, backside and right end extending along the width;
- a second tension-wrapped thermoplastic composite overwind wrapped around the substrate about the frontside, top end, backside and bottom end extending along the height;
- wherein a first portion of the first and/or second overwind overlaps a second portion of the first and/or second overwind, wherein the first and second portions are fixedly attached to one another utilizing a localized heating;
- wherein the first and second overwinds include a tensile pretension of at least 50 lbs of tensile force per inch of tape width; and
- a backing disposed about the backside of the ceramic substrate attached to the first and/or second overwind;
- wherein the ceramic substrate has a higher modulus of elasticity in comparison to the first and second overwinds;
- wherein the first and the second overwinds have a higher modulus of elasticity in comparison to the backing;
- wherein the ceramic substrate has a modulus of elasticity above 400 GPa; and
- wherein the backing has a modulus of elasticity below 150 GPa.

19. The pre-compressed ceramic-based anti-ballistic composite armor of claim 18, wherein the ceramic substrate is boron carbide, silicon carbide, aluminum oxide or titanium diboride.

20. The pre-compressed ceramic-based anti-ballistic composite armor of claim 19, wherein the backing comprises an ultra-high-molecular-weight polyethylene fiber or an aramid fiber composite.

21. The pre-compressed ceramic-based anti-ballistic composite armor of claim 20, wherein the first overwind comprises a continuous fiber reinforced thermoplastic polymer, wherein the continuous fiber comprises carbon fiber, glass fiber, basalt fiber or aramid fiber and the thermoplastic polymer comprises PE, PP, PA, PPS or PEEK.

22. The pre-compressed ceramic-based anti-ballistic composite armor of claim 21, wherein the first and second tensile pretensions are less the ultimate tensile strength of the first and second overwinds, or wherein the first and second tensile pretensions are less than the yield strength of the first and second overwinds.

* * * * *

UNITED STATES PATENT AND TRADEMARK OFFICE
CERTIFICATE OF CORRECTION

PATENT NO. : 12,055,369 B2
APPLICATION NO. : 17/454241
DATED : August 6, 2024
INVENTOR(S) : David Edgar Hauber Page 1 of 1

It is certified that error appears in the above-identified patent and that said Letters Patent is hereby corrected as shown below:

In the Claims

Column 8, Claim 6, Line 25, "ultra" should read --ultra-high--.

Column 10, Claim 22, Line 30, "less" should read --less than--.

Signed and Sealed this
First Day of October, 2024

Katherine Kelly Vidal
*Director of the United States Patent and Trademark Office*